United States Patent
Steinbichler et al.

(10) Patent No.: US 7,436,522 B2
(45) Date of Patent: Oct. 14, 2008

(54) METHOD FOR DETERMINING THE 3D COORDINATES OF THE SURFACE OF AN OBJECT

(75) Inventors: Marcus Steinbichler, Neubeuern (DE); Armin Maidhof, Rohrdorf (DE); Matthias Prams, Raubling (DE); Makus Leitner, Lauterbach (DE)

(73) Assignee: Steinbichler Optotechnik GmbH, Neubeuern (DE)

( * ) Notice: Subject to any disclaimer, the term of this patent is extended or adjusted under 35 U.S.C. 154(b) by 0 days.

(21) Appl. No.: 11/436,212

(22) Filed: May 18, 2006

(65) Prior Publication Data

US 2006/0265177 A1    Nov. 23, 2006

(30) Foreign Application Priority Data

May 18, 2005    (DE)    ......................... 10 2005 022 865
Sep. 14, 2005    (DE)    ......................... 10 2005 043 912

(51) Int. Cl.
*G01B 11/24*    (2006.01)

(52) U.S. Cl. .................. 356/601; 356/141.4; 356/601; 356/337; 702/20; 702/21; 702/150

(58) Field of Classification Search ... 356/141.4–141.5, 356/601, 602, 337; 702/20, 21, 150
See application file for complete search history.

(56) References Cited

U.S. PATENT DOCUMENTS 6,029,118 A * 2/2000 Strasser ....................... 702/150
6,915,008 B2 * 7/2005 Barman et al. ................ 356/12

* cited by examiner

*Primary Examiner*—Gregory J Toatley, Jr.
*Assistant Examiner*—Iyabo S Alli
(74) *Attorney, Agent, or Firm*—Dilworth & Barrese, LLP

(57) ABSTRACT

A method serves to determine the 3D coordinates of an object. The 3D coordinates of a partial surface (6) of the object are determined by a 3D measuring device (3), which includes one or more detectors (4) and whose position is determined by a tracking system. The 3D coordinates of an adjacent partial surface (7) of the object are determined by the 3D measuring device (3). The 3D coordinates of an overlap region of he adjacent partial surfaces (6,7) are put together by a matching method. In doing so, an error function is determined and minimized iteratively. Furthermore, the error function of a detector (4) of the 3D measuring device (3) is determined.

21 Claims, 1 Drawing Sheet

METHOD FOR DETERMINING THE 3D COORDINATES OF THE SURFACE OF AN OBJECT

This invention relates to a method for determining the 3D coordinates of the surface of an object.

Such methods are known already.

BACKGROUND OF THE INVENTION

From EP 553 266 B1, there is known a method for determining the 3D coordinates of the surface of an object, in which the 3D coordinates of the surface of the object are determined by a 3D measuring device. According to this method, the position and the orientation of a 2D laser scanner are determined by means of an optical tracking system in a high resolution with respect to time, for instance with about 100 images per second. By means of this method, measurement errors of 0.1 to 0.5 mm can be implemented within a measurement volume of about 4 m×4 m×6 m.

In another prior art method, the 3D coordinates of the surface of an object are determined by a camera-based optical 3D measuring device, where the position and the orientation of this 3D measuring device are not determined directly. The 3D measuring device scans individual partial surfaces, for instance within a volume of 1 m×1 m×1 m. Subsequently, the 3D coordinates of the partial surfaces of the object are put together, in particular by means of a calculation method performed in a computer, for instance a PC. To do so, several possibilities exist:

A first possibility consists in putting together the 3D coordinates of the overlap region of adjacent partial surfaces by means of a matching method, which in the specialized literature is also referred to as "registration" or "registration method". In accordance with this method, partial surfaces, in particular structured partial surfaces, are scanned with an overlap. The distances of the 3D coordinates of two measurements of adjacent partial surfaces are minimized in the overlap region. In terms of software, this is effected by a matching algorithm, in which an error function is determined for points of the overlap region and minimized iteratively. In the case of relatively small, structured surfaces, good results can be achieved therewith. In the case of large objects, however, there can only be achieved measurement errors of 0.2 to 1.0 mm due to the propagation of errors. A second possibility consists in performing a transformation onto reference points. In this case, reference marks are adhered onto the surface of the object. The reference marks are calibrated by means of a measuring machine, in particular a tactile or optical measuring machine. Scanning the surface or a partial surface is effected such that at least three of the measurement marks are detected in such individual measurement, i.e. are scanned photogrammetrically. From the measurement marks thus detected, and from their previously calibrated positions, a transformation can be determined. If this transformation is applied to the individual measurement, the measured values of the surface are obtained. In this method, measurement errors of 0.05 to 0.2 mm can also be achieved with large objects. A major disadvantage, however, consists in that as a result of the application of the reference marks the object to be scanned must be prepared in a time-consuming way. A third possibility consists in combining the first and second possibilities, in order to reduce the effort of the second possibility, but at the same time become more accurate than with the first possibility, i.e. achieve smaller measurement errors.

SUMMARY OF THE INVENTION

It is the object of the invention to propose an improved method for determining the 3coordinates of the surface of an object. In accordance with the invention, this object is solved by the features herein. In a first step, the 3D coordinates of a partial surface of the object are determined by a 3D measuring device. The position of the 3D measuring device is determined by a tracking system. For this purpose, one or more detectors are provided or mounted on the 3D measuring device or connected with the same. In a second step before or after the first step the 3D coordinates of an adjacent partial surface of the object are determined by the 3D measuring device. In a third step, the 3D coordinates of an overlap region or of the entire overlap region of the adjacent partial surfaces are put together by a matching method. In the matching method, an error function is determined and preferably minimized iteratively. In accordance with the invention, the error function of a detector of the 3D measuring device is determined. When determining the 3D coordinates of the surface of relatively large objects, the measurement accuracy can be improved thereby. When performing this method in practice, the complete scan of the object consists of N individual measurements overlapping each other, N typically being a number between 5 and 200. The position of the 3D measuring device need only be determined by the tracking system in the case of an individual measurement. In most applications, however, the method of the invention only provides an improvement when the position of the 3D measuring device is determined by the tracking system in a total of at least two individual measurements. Advantageously, the position of the 3D measuring device is determined by the tracking system in many or in all individual measurements. Advantageous embodiments are described herein. Advantageously, it is determined whether the error function of the detector of the 3D measuring device exceeds a specific value. The value of the error function includes the deviation of the detector. Advantageously, it is determined whether the absolute value of the error function exceeds a specific value. It is, however, also possible to use the amount in one or more or all directions, in particular in the X, Y and/or Z directions, as deviation of the error function. The specific value, which is exceeded by the error function, can be firmly specified. However, it is also possible to determine this specific value while performing the matching method. The specific value can be a value corresponding to the measurement tolerance of the tracking system. In accordance with another advantageous embodiment, the error function of the detector of the 3D measuring device is included in the matching method. Particularly advantageously, the error function of the detector of the 3D measuring device is included in the matching method when the error function of the detector exceeds a specific value. The error function of the detector can be included in the matching method with a specific weighting. The weighting can be greater or smaller than, but also just as great as that of the 3D coordinates from the overlap region. The value of the weighting can be firmly specified. However, it is also possible to determine and/or change the value of the weighting while performing the matching method. Particularly advantageously, a specific weighting of the error function of the detector is used, when or as long as the error function of the detector does not exceed a specific value, or a different weighting is used, when or as soon as the error function of the detector exceeds a or the specific value. In particular, the value of the weighting can be defined such that the error function of the detector is not included in the matching method when or as long as the error function of the detector does not exceed a specific value, and that as weighting of the error function of the detector the same value as that for the 3D coordinates from the overlap region is used, when or as soon as the error function of the detector exceeds a specific value.

Another advantageous embodiment is characterized in that the error functions of several detectors of the 3D measuring device are determined. Advantageously, it is determined whether the error function of one or more or all detectors exceeds a specific value. In the advantageous embodiments described above, this error function or the greatest error function preferably is used as relevant error function.

In accordance with another advantageous embodiment, the error function of one or more or all detectors of the 3D measuring device is included in the matching method. This can be done with a specific weighting.

Another advantageous embodiment is characterized in that one or more 3D coordinates of the surface of the object are determined by another 3D measuring device, whose position is determined by a tracking system. The tracking system can be that tracking system by means of which the position of the first 3D measuring device is determined. It is, however, also possible to use a further tracking system. By means of the further 3D measuring device, in particular the 3D coordinates of one or more identifiable points on the surface of the object are determined. These can be one or more distinguished points which are present on the surface of the object. Instead or in addition, reference marks on the surface can also be used as identifiable points.

In accordance with another advantageous embodiment, one or more or all points determined by the further 3D measuring device and/or detectors are included in the matching method. This can be effected in the form of side conditions.

BRIEF DESCRIPTION OF THE DRAWINGS

One embodiment of the invention will subsequently be explained in detail with reference to the accompanying drawing, in which.

DESCRIPTION OF THE PREFERRED EMBODIMENTS

Figure 1:
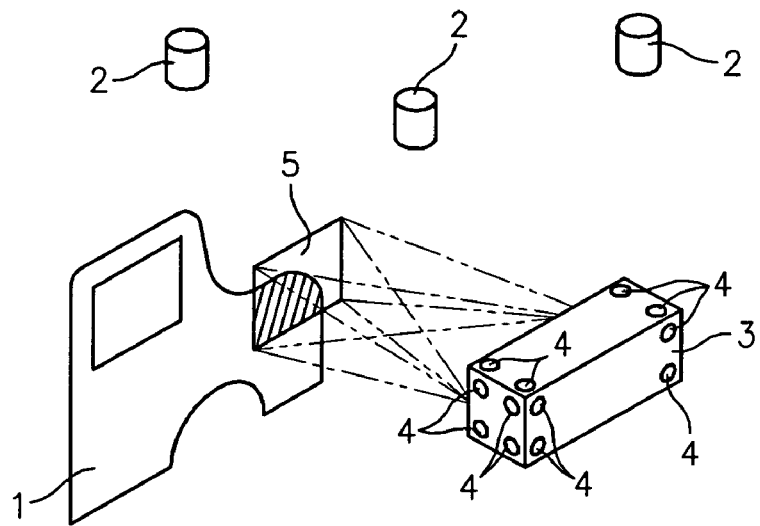
FIG. 1 shows an object, a 3D measuring device and a tracking system in a schematic perspective representation.

In the arrangement shown in FIG. 1, the surface of an object 1 (object under measurement) is determined by a 3D measuring device 3, whose position is determined by a tracking system 2. On the 3D measuring device, a plurality of detectors 4 are disposed, whose position is determined by the tracking system 2. The 3D measuring device determines the 3D coordinates of a partial surface 5 of the object 1.

By means of the tracking system 2, the position and the orientation of the 3D measuring device 3 are determined during and/or directly before and/or directly after the determination of the 3D coordinates of the partial surface 5. This is achieved in that on the 3D measuring device 3 a sufficient number of detectors 4 are provided, which are connected with the 3D measuring device 3. The detectors 4 can be rigidly connected with the 3D measuring device 3. In certain applications, it can, however, also be sufficient that the detectors are arranged and mounted such that there is a clear reference to the 3D measuring device, which always provides the same measured values. In a laser tracking system, for instance, pentaprisms or triple prisms can be used as detectors. These prisms can be rotatably mounted about their axis, without the measured values being influenced thereby.

To be able to determine the position and orientation of the 3D measuring device 3, there are either required at least three detectors 4, for each of which the position can be determined, or at least one detector 4, which can provide both the position and the orientation. When the 3D measuring device 3 is moved within the range of detection of the tracking system 2, the tracking system 2 provides one 3D coordinate for each detector 4. When at least three coordinates are present for three detectors 4, the position and orientation of the 3D measuring device 3 can be calculated therefrom.

Available tracking systems provide measurement errors in the range from 0.05 to 0.1 mm when determining the position of individual detectors 4. Since an optical 3D measuring device 3 generally requires a relatively large distance from the surface of the object 1, which can lie in the range from 400 to 1600 mm, typically at about 800 mm, and since practical considerations furthermore require the detectors 4 to be mounted close to the 3D measuring device 3, this single-point error generally translates to the measured 3D coordinates to a relatively great extent as a result of the "lever action", whereby the measurement error is reduced in practice to 0.2 to 1 mm.

As 3D measuring device 3, there can also be used multistage systems, i.e. for instance a system which consists of a stationary system and a hand-held scanner, for instance a laser scanner, which is tracked by this system. It is also possible to monitor the position and orientation of the stationary system in accordance with the invention. The measurement range of this system can significantly be increased thereby.

The 3D measuring device can be an optical 3D measuring device, in particular a laser measuring device or a white-light projection system. It can, however, also be a measuring device operating on a tactile basis. For performing the measurement task, the 3D measuring device can be guided manually by an operator. It can, however, also be guided automatically, for instance by a robot, a machine tool, a measuring machine or the like. Furthermore, it is possible to guide the 3D measuring device 3 partly automatically. In this case, the accuracy of the movement has no influence on the measurement accuracy that can be achieved.

The tracking system 2 covers a detection volume which comprises the range of movement of the 3D measuring device 3. The range of movement of the 3D measuring device 3 is defined by the size, structure and geometry of the object 1 and by the constitution, in particular the measurement distance of the 3D measuring device 3. When the detection volume of the tracking system 2 is too small for this purpose, a plurality of tracking systems can be used simultaneously or sequentially, in order to increase the range of detection in this way. Instead or in addition, the object 1 can, however, also be divided into partial surfaces to be measured sequentially; the relative position of the tracking system 2 with respect to the object 1 must then be newly aligned upon detection of a partial surface, such that the next partial surface can be detected.

Particularly useful are tracking systems on the basis of the so-called Indoor GPS, similar to the GPS system installed around the globe. In accordance with this system, halls of any size, up to assembly halls for aircraft, can be equipped with a corresponding number of so-called transmitters. Every single transmitter scans a part of the hall by means of light planes generated by the transmitter. The use of a plurality of transmitters ensures that the entire hall or the required part of the hall is scanned by means of these light planes. Each detector 4 detects the occurrence of light and, from a time synchronisation with the transmitter, determines the extent of deflection of the light plane at this moment. As a result, the orientation of the light plane in space is known, and the 3D position of the respective detector 4 can be determined. One embodiment is described in U.S. Pat. No. 6,630,993 B1. This technology can provide the advantage that even great halls can be used as measurement rooms at relatively low cost.

Particularly useful are also triangulation-based tracking systems or laser trackers. In FIG. 1, the tracking system 2 comprises three sensors, which can be used for determining the position of each detector 4 on the 3D measuring device, in order to perform a triangulation method. When using a laser tracker, one sensor is sufficient.

Furthermore, other signals such as e.g. ultrasonic, IR (infrared) or run-time signals can also be used for the tracking system.

The detectors 4 to be used are specified by the tracking system 2. The tracking system can employ passive or active detectors. The detectors 4 can employ optical detectors (light pulses, light spots, marks, optical run-time measurement, theodolite measurement methods, etc.) or other electromagnetic waves or signals. Depending on the tracking system, different kinds of sensors can also be used simultaneously.

Preferably, the determined positions of the detectors 4 are time averaged, in order to decrease the measurement noise. It is furthermore advantageous to determine the position of the detectors 4 before, during and after the determination of the 3D coordinates of the object 1 or of the partial surface 5, in order to thus detect whether the 3D measuring device 3 actually was at rest.

When the detectors 4 are arranged on the 3D measuring device 3, it is advantageous when these detectors 4 are arranged around the 3D measuring device rather uniformly. Thereby, it is ensured that at least three of the detectors 4 are detected by the tracking system 2 with any orientation of the 3D measuring device 3. It is furthermore advantageous when the distance between the detectors 4 is chosen rather large, as measurement errors occurring during the determination of the position of the detectors 4 are translated to angular errors when determining the orientation of the 3D measuring device. The larger the chosen distance of the detectors 4, the smaller the "lever action" and hence the propagation of errors.

Advantageously, in each position of the 3D measuring device 3 more than three detectors 4 can be detected at the same time. In this case, the overdetermination can be utilized to improve the determination of the position and orientation of the 3D measuring device (averaging effect). Likewise, individual "outliers" among the position data can be detected due to the redundant information.

Figure 2:
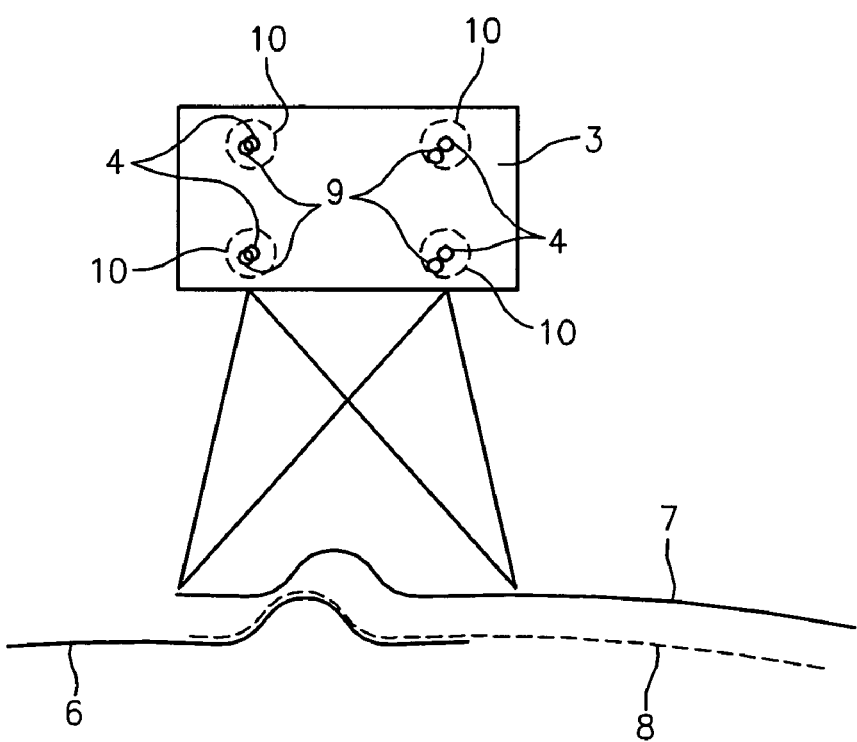
FIG. 2 shows the arrangement of FIG. 1 in a schematic top view.

In the embodiment shown in FIGS. 1 and 2, four detectors 4 are each provided on each side of the 3D measuring device, which are located in the vicinity of the corners of each surface.

FIG. 2 shows a section 6 through the first partial surface 5 of the object 1. The 3D coordinates of the partial surface 5 of the object 1 are determined by the 3D measuring device 3, the position of the 3D measuring device 3 being determined by the tracking system 2.

Subsequently, the 3D coordinates of an adjacent partial surface 7 of the object 1 are determined by shifting the 3D measuring device 3. Here as well, the position of the 3D measuring device 3 is determined by the tracking system 2; however, this is not absolutely necessary for performing the invention.

As can be taken from FIG. 2, the positions of the first partial surface 6 and of the second partial surface 7 are different from each other in the overlap region, namely due to inaccuracies of the determination of the 3D coordinates by the 3D measuring device and/or the determination of the position and/or orientation of the 3D measuring device by the tracking system 2. To eliminate the distance between the first partial surface 6 and the second partial surface 7, the 3D coordinates of a or the overlap region of the adjacent partial surfaces 6, 7 are put together by a matching method. When performing the matching method, an error function is determined for points of the overlap region and minimized preferably iteratively. In the example of FIG. 2, the 3D coordinates of the second partial surface 7 are shifted to the position 8 indicated in broken lines as a result of the matching method. Here, the distances of the 3D coordinates are minimized in the overlap region of the adjacent partial surfaces.

By shifting the 3D coordinates of the second partial surface from the position designated with 7 to the position designated with 8, the positions of the detectors also have virtually shifted, namely from the positions designated with 4 to the positions designated with 9. In accordance with the method of the invention, the error functions of the detectors 4 of the 3D measuring device 3 are determined. The absolute values of the error functions are determined therefrom. It is determined whether the absolute values of the error functions of the detectors 4 of the 3D measuring device 3 exceed a specific value. In FIG. 2, this specific value is drawn as sphere 10 with a specific radius around the detectors 4. The determination as to whether the absolute value of the error function of the detectors 4 exceeds a specific value corresponds to the determination as to whether the virtually shifted positions 9 of the detectors 4 lie outside the respective sphere 10 around the original position of the respective detector 4.

In the example of FIG. 2, all virtually shifted positions 9 of the detectors 4 lie inside the respective sphere 10. Hence, the absolute values of the error functions of the detectors 4 do not exceed the specific value.

When one of the virtual positions 9 lies outside the associated sphere 10, i.e. when the error function of a detector 4 exceeds the specific value, the error function of this detector and/or of one or more or all further detectors is included in the matching method.

When performing the matching method, the error functions of the detectors 4 are initially not included in the matching method. In other words, the error functions of the detectors 4 are included in the matching method with the weighting 0. When the error function of one or more or all detectors is included in the matching method, this is effected with the weighting 1 in this example. Thus, the one or more detectors 4 are included in the matching method with the same weighting as the 3D coordinates of the partial surfaces 6, 7.

By means of the invention, a high measurement accuracy can be achieved on the whole, without it being necessary to change the surface of the object 1. In particular, no reference marks must be adhered onto its surface. A preparation of the object 1 is not required. As a result, the method of the invention is suited for use in a production line with a high measurement frequency.

By means of the method of the invention it can be ensured that the position of the detectors 4 as determined by the tracking system 2 maximally moves within a specific tolerance volume 10. It can thus be ensured that matching errors do not add up from one partial surface to the next. In the ideal case, a total measurement accuracy can be achieved, which corresponds to the measurement accuracy of the tracking system 2. In certain applications, there can even be achieved a total measurement accuracy greater than the measurement accuracy of the tracking system.

The accuracy of the entire system can also be increased in that a further 3D measuring device is used, by means of which one or more 3D coordinates of the surface of the object are determined, position and orientation of the further 3D measuring device being determined by a tracking system. This can be that tracking system by means of which the position of the first 3D measuring device is determined, or a further tracking system. It is also possible to use a plurality of further 3D measuring devices. One or more or all points determined by the further 3D measuring device can be included in the matching method. The further 3D measuring device can in particular be a tactile measuring device, which is much more precise in detecting individual points on the object 1, as e.g. a shorter distance of measurement is provided. If certain identifiable points (distinguished points) of the surface of the object are scanned with a higher accuracy, this information can also be included in the matching method, in particular in the form of side conditions.

The matching method can be performed by an ICP method (ICP=Iterative Closest Point) or by a method which is based on an ICP method. For each point of a cloud of points a corresponding point in another cloud of points is determined. Subsequently, the best-fit transformation is determined, which transforms the points onto each other. There is used an error function which is minimized, the error function describing the distance of the respectively corresponding points from each other.

When performing the matching method, the error function is minimized iteratively. Commonly used methods for this purpose include for instance the Levenberg-Marquardt, quasi-Newton, steepest descent or conjugate gradient methods. Typically, the iterative minimization is performed as follows:

set the current parameters from the starting values;
repeat:
define new parameters which generate a lower function value of the error function;
until an abort criterion is satisfied.

A typical abort criterion exists when the change of the function value is smaller than a predetermined threshold or when the number of iterations exceeds a predetermined threshold.

In accordance with the invention, the error function can consist of two parts, namely of the deviations of the clouds of points, i.e. the points from the overlap region of adjacent partial surfaces 6, 7, and of the deviations of the tracked points, i.e. of one or more detectors. By combining both parts, it can be ensured that the cloud of points does not move out of an admitted region when the matching method is performed. The combination of the two deviations can be formed by a weighted addition. The weighting can be adjusted such that the proportion of a tracked point-to-point correspondence (detector correspondence) becomes greater than the proportion of the cloud of points (in the overlap region of adjacent partial surfaces), when and/or as soon as the point-to-point deviation (detector deviation) of the tracked points leaves the respective range of tolerance. In particular, the weighting can be performed as follows: As long as the tolerance range of the point-to-point deviation (detector deviation) is not exceeded, the associated weighting is zero; when and/or as soon as this tolerance range is exceeded, the associated weighting is 1.

The invention claimed is:

1. A method for determining the 3D coordinates of the surface of an object, comprising the steps of:
measuring the 3D coordinates of a partial surface (5,6) of the object (1) by a 3D measuring device (3);
measuring the position and orientation of said 3D measuring device by a tracking system (2), wherein said determination is effected by at least one detector placed on said 3D measuring device for detection by said tracking system (2);
determining the 3D coordinates of an adjacent partial surface (7) of the object (1) by the 3D measuring device;
performing a matching method to determine and minimize an error function of a detector (4) of the 3D measuring device and/or tracking system for certain of said 3D coordinates measured at said steps (a) and (c) that fall into a overlap region between said partial surface (5, 6) and said adjacent partial surface (7);
wherein said matching method minimizes the different measured distances of said certain 3D coordinates of points in said overlap region.

2. The method as claimed in claim 1, comprising the additional step of determining whether the error function of the detector (4) of the 3D measuring device (3) exceeds a specific value (10).

3. The method as claimed in claim 1, wherein the error function of the detector (4) of the 3D measuring device (3) is included in the matching method.

4. The method as claimed in claim 3, wherein the error function of the detector (4) is included in the matching method with a specific weighting.

5. The method as claimed in claim 1 comprising the additional step of determining the error functions of several detectors (4) of the 3D measuring device (3).

6. The method as claimed in claim 5, wherein the error function of one or more or all detectors (4) of the 3D measuring device (3) is included in the matching method.

7. The method as claimed in claim 1 comprising the step of determining one or more 3D coordinates of the surface of the object (1) by a further 3D measuring device, whose position is determined by a tracking system (2).

8. The method as claimed in claim 7, wherein one or more or all points determined by the further 3D measuring device and/or detectors are included in the matching method.

9. The method as claimed in claim 2, wherein the error function of the detector (4) of the 3D measuring device (3) is included in the matching method.

10. The method as claimed in claim 9, wherein the error function of the detector (4) is included in the matching method with a specific weighting.

11. The method as claimed in claim 10, comprising the additional step of determining the error functions of several detectors (4) of the 3D measuring device.

12. The method as claimed in claim 2, comprising the additional step of determining the error functions of several detectors (4) of the 3D measuring device (3).

13. The method as claimed in claim 3, comprising the additional step of determining the error functions of several detectors (4) of the 3D measuring device (3).

14. The method as claimed in claim 3, comprising the additional step of determining the error functions of several detectors (4) of the 3D measuring device (3).

15. The method as claimed in claim 9, comprising the additional step of determining the error functions of several detectors (4) of the 3D measuring device.

16. The method as claimed in claim 15, wherein the error function of one or more or all detectors (4) of the 3D measuring device (3) is included in the matching method.

17. The method as claimed in claim 11, wherein the error function of one or more or all detectors (4) of the 3D measuring device (3) is included in the matching method.

18. The method as claimed in claim 12, wherein the error function of one or more or all detectors (4) of the 3D measuring device (3) is included in the matching method.

19. The method as claimed in claim 13, wherein the error function of one or more or all detectors (4) of the 3D measuring device (3) is included in the matching method.

20. The method as claimed in claim 14, wherein the error function of one or more or all detectors (4) of the 3D measuring device (3) is included in the matching method.

21. The method as claimed in claim 1, wherein said determination is effected by at least three detectors placed on said 3D measuring device.

* * * * *